(12) United States Patent
Nishida et al.

(10) Patent No.: US 11,858,555 B2
(45) Date of Patent: Jan. 2, 2024

(54) FRONT BODY STRUCTURE OF VEHICLE

(71) Applicant: Mazda Motor Corporation, Hiroshima (JP)

(72) Inventors: Kenji Nishida, Hiroshima (JP); Chikara Kawamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 54 days.

(21) Appl. No.: 17/590,821

(22) Filed: Feb. 2, 2022

(65) Prior Publication Data

US 2022/0274653 A1    Sep. 1, 2022

(30) Foreign Application Priority Data

Feb. 26, 2021    (JP) ................................. 2021-030069

(51) Int. Cl.
| | | |
|---|---|---|
| *B62D 25/08* | (2006.01) | |
| *B62D 25/14* | (2006.01) | |
| *B62D 29/04* | (2006.01) | |

(52) U.S. Cl.
CPC ......... *B62D 25/088* (2013.01); *B62D 25/082* (2013.01); *B62D 25/14* (2013.01); *B62D 29/043* (2013.01)

(58) Field of Classification Search
CPC .... B62D 25/088; B62D 25/082; B62D 25/14; B62D 29/043; B62D 29/04
USPC .................................................... 296/203.02
See application file for complete search history.

(56) References Cited

U.S. PATENT DOCUMENTS

| | | | | |
|---|---|---|---|---|
| 5,411,311 | A  * | 5/1995 | Shimmell ............ | B62D 25/082 |
| | | | | 280/798 |
| 9,073,580 | B2 * | 7/2015 | Bechtler .............. | B62D 25/088 |
| 9,868,471 | B2   | 1/2018 | An et al. | |
| 2020/0062315 | A1 | 2/2020 | Matsuoka et al. | |
| 2020/0198551 | A1* | 6/2020 | Grajek .................. | B29C 70/865 |

FOREIGN PATENT DOCUMENTS

| | | | | |
|---|---|---|---|---|
| DE | 102013218688 A1 | 3/2015 | | |
| JP | 2010-173546 A | 8/2010 | | |
| JP | 2020-29162 A | 2/2020 | | |
| WO | WO-2016132655 A1 * | 8/2016 | ............. | B32B 27/04 |

OTHER PUBLICATIONS

Extended European search report dated Aug. 1, 2022, in corresponding European patent Application No. 22154221.0, 8 pages.

* cited by examiner

*Primary Examiner* — Pinel E Romain
(74) *Attorney, Agent, or Firm* — XSENSUS LLP

(57) ABSTRACT

A front body structure of a vehicle includes a dash member that extends in a vehicle width direction and separates a vehicle interior from an engine room, a pair of left and right front side frames that extend from left and right end portions of the dash member, and a pair of left and right suspension towers that are fixed to the pair of front side frames and support the upper portions of dampers of a suspension device. A first coupling member couples the dash member to the suspension towers. The first coupling member has a reinforced layer portion made of fiber reinforced plastic in which fibers are impregnated with a synthetic resin material. The fibers of the reinforced layer portion are oriented so that more fibers extend in a longitudinal direction than extend in directions other than the longitudinal direction.

20 Claims, 11 Drawing Sheets

30: FIRST COUPLING MEMBER
40: SECOND COUPLING MEMBER
50: FRONT FIXING MEMBER
60: REAR FIXING MEMBER
2 FRONT SIDE FRAME

1: DASH PANEL
6: COWL MEMBER

FIRST COUPLING OUTER MEMBER 31
31x BENT PORTION

FIRST COUPLING INNER MEMBER 32
32x BENT PORTION

L1: FIBER REINFORCED PLASTIC LAYER WITH ORIENTATION OF 90°
L2: FIBER REINFORCED PLASTIC LAYER WITH ORIENTATION OF 0°

FRONT BODY STRUCTURE OF VEHICLE

CROSS-REFERENCE TO RELATED APPLICATION

The present application claims priority to Japanese application number 2021-030069 filed in the Japanese Patent Office on Feb. 26, 2021, the entire contents of which is incorporated herein by reference. This application is also related to U.S. Patent Application Serial Number; filed on: Feb. 2, 2022; entitled BODY STRUCTURE OF VEHICLE; the entire contents of both of which being incorporated herein by reference.

TECHNICAL FIELD

Embodiments relate to a front body structure of a vehicle in which a dash member is coupled to a suspension tower member by a coupling member made of fiber reinforced plastic including fibers impregnated with a synthetic resin material.

BACKGROUND ART

A vehicle body bends and deforms when receiving a large load via the damper mechanism of the suspension device of the vehicle since the top portions (referred to as the suspension tower top portions) of suspension tower members provided in the vehicle body support the damper mechanism.

In particular, the body torsional mode occurs because suspension tower top portions are displaced vertically when the vehicle turns, so the operational safety of the vehicle and the riding comfort of the occupants may be degraded.

The front body structure of a vehicle in the patent document 1 has an object of suppressing the vertical displacement of the suspension tower top portions and includes a dash panel that separates the vehicle interior from the engine room, a cowl portion mounted on this dash panel, a pair of left and right front side frames extending forward in the front-rear direction of the vehicle body from the left and right end portions of the dash panel, and a pair of left and right suspension tower members, coupled to the outer portions in the vehicle width direction of the pair of front side frames, that project upward to support the upper portions of the dampers of the suspension device, in which a pair of left and right metal suspension tower bars that couple the cowl portion to the suspension tower members are provided.

In recent years, fiber reinforced plastic such as, for example, carbon fiber reinforced plastic (CFRP) including impregnated carbon fibers has physical properties of high specific strength (strength/specific gravity) and high specific rigidity (rigidity/specific gravity), which are so-called lightness and strength•rigidity, so carbon fiber reinforced plastic is widely used as structural materials for aircraft, vehicles, and the like. Since mechanical properties such as strength are provided by carbon fibers and the stress transfer function and the fiber protection function between carbon fibers are provided by the base material resin (matrix), this carbon fiber reinforced plastic forms an anisotropic material whose physical properties differ greatly between the fiber direction in which the fibers extend and the non-fiber direction (so-called load direction).

A technology for using fiber reinforced plastic has been proposed to achieve both body rigidity and weight reduction. The suspension tower bars in patent document 2 couple the suspension tower top portions of a pair of left and right suspension tower members to each other or the pair of suspension tower top portions and the dash member (for example, the cowl portion) to each other, the body portions of the suspension tower bars are formed by fiber reinforced plastic plate materials, and the fiber reinforced plastic plate materials are formed so that FRP sheets with fiber orientation angles of 0°/90° and FRP sheets with fiber orientation angles of 45°/−45° are stacked alternately.

PRIOR ART DOCUMENTS

Patent Documents

[Patent document 1] JP-A-2020-029162
[Patent document 2] JP-A-2010-173546

SUMMARY

Problems to be Solved

Since the suspension tower members fall inward and the cowl portion is displaced vertically like a bow during a travel on a rough road, torsional displacement is caused between the suspension tower top portions and the dash member including the cowl portion. Since the membrane vibration mode occurs in the panel members such as the floor panel due to the torsional displacement between the suspension tower top portions and the dash member, the travel noise performance of the vehicle may degrade.

In such a case, the membrane vibration mode of the panel member can be suppressed by increasing the mounting rigidity of the suspension tower members or increasing the plate thickness of the dash member including the cowl portion, but this increases the weight of the car body.

The vertical displacement of the suspension tower top portions can be reduced by providing the suspension tower bars that firmly couple the suspension tower top portions of the pair of the suspension tower members to the cowl portion as in the technologies in the patent documents 1 and 2. That is, since the body torsional mode can be suppressed by the bending rigidity of the suspension tower bars, the riding comfort can be improved.

However, the suspension tower bars that couple the suspension tower members to the cowl portion can suppress the body torsional mode, but cannot suppress the membrane vibration mode.

That is, it is not easy to reduce both the vertical displacement of the suspension tower top portions and the torsional displacement between the suspension tower top portions and the dash member at the same time without increasing the weight of the vehicle body.

One or more embodiments is directed to providing a front body structure of a vehicle and the like that can reduce the vertical displacement of the top portions of the suspension towers and damp vibrations in the torsional direction between the top portions of the suspension towers and the dash member without increasing the weight of the vehicle body.

Means for Solving the Problems

According to a first aspect, there is provided a front body structure of a vehicle including: a dash member that extends in a vehicle width direction and separates a vehicle interior from an engine room; a pair of left and right front side frames that extend forward in a vehicle front-rear direction from left and right end portions of the dash member; and a pair of left and right suspension tower members fixed to the pair of front side frames, the pair of left and right suspension tower members projecting upward to support upper portions of dampers of a suspension device, in which a first coupling member that couples the dash member to a suspension member is provided, the first coupling member has a reinforced layer portion made of fiber reinforced plastic in which fibers are impregnated with a synthetic resin material, and the fibers of the reinforced layer portion are oriented so that fibers extending in a longitudinal direction are more than fibers extending in directions other than the longitudinal direction.

According to this structure, since the first coupling member that couples the dash member and the suspension tower members is provided, the vertical displacement of the suspension top portions can be reduced and the body torsional mode can be suppressed by using the bending rigidity of the first coupling member.

Since the first coupling member has the reinforced layer portion made of the fiber reinforced plastic in which fibers are impregnated with the synthetic resin material and the fibers of the reinforced layer portion are oriented so that the fibers extending in the longitudinal direction are more than the fibers extending in the directions other than the longitudinal direction, the torsional displacement between the upper portions of the suspension tower members and the dash member can be converted to the torsional displacement of the first coupling member and the vibration damping capacity of the vehicle is increased and the membrane vibration mode is suppressed.

In a second aspect, the front body structure of a vehicle according to the first aspect further includes a pair of left and right first coupling members that couple the dash member to the pair of suspension tower members, the first coupling member being one of the pair of left and right first coupling members; a second coupling member that couples rear end portions of the pair of first coupling members to each other; a pair of left and right front fixing members that fix front end portions of the pair of first coupling members to the pair of suspension tower members; and a pair of left and right rear fixing members that connect, at connection portions, rear end portions of the pair of first coupling members to side end portions of the second coupling member and fixes the connection portions to the dash member, in which the pair of first coupling members and the second coupling member are substantially U-shaped in plan view. According to this structure, the pair of left and right first coupling members can be configured as a single component and the ease of handling can be improved. In addition, the coupling members can be formed long and linearly and the anisotropy tendency of the coupling members can be increased.

According to a third aspect, in the front body structure of a vehicle according to the first or second aspect, the first coupling member has a bent portion that projects upward and extends in the vehicle width direction. According to this structure, at the time of a front collision of the vehicle, the broken portion of the first coupling member can be guided to the upper rear, whereby the interference between components such as pipes disposed around the engine and the broken portion can be avoided.

According to a fourth aspect, in the front body structure of a vehicle according to the second or third aspect, the first coupling member and the second coupling member form a closed cross section extending in the longitudinal direction by fitting an inner member having a substantially U-shaped cross section to an outer member having a substantially U-shaped cross section. According to this structure, the closed cross section formed in cooperation by the outer member and the inner member can increase the torsional rigidity of the first coupling member and the second coupling member while the bending rigidity of the first coupling member and the second coupling member can be controlled by the open cross section formed by one of the outer member and the inner member.

According to a fifth aspect, in the front body structure of a vehicle according to the fourth aspect, the closed cross section is asymmetric with respect to a middle line of a cross section orthogonal to the longitudinal direction in the cross section. According to this structure, even when a bending load is input to the first coupling member and the second coupling member, the bending load can be easily converted to the torsional displacement of the first coupling member and second coupling member.

According to a sixth aspect, in the front body structure of a vehicle according to any one of the second to fifth aspects, a ratio of a volume of the reinforced layer portion to a volume of the first coupling member and the second coupling member is set to 80% or more. According to this structure, the practical utility and the suppressive effects of the body torsional mode and the membrane vibration mode can be compatible. The suppressive effects of the body torsional mode and the membrane vibration mode may not be enough when the ratio of the volume of the reinforced layer portion is less than 80%, but the vehicle body behavior mode can be suppressed while measures against electrolytic corrosion of the first coupling member and the second coupling member are taken when the ratio of the volume of the reinforced layer portion is not less than 80%.

[Advantages]

In the front body structure of a vehicle according to one or more embodiments, the vertical displacement of the top portions of the suspension towers can be reduced and vibrations in the torsional direction between the top portions of the suspension towers and the dash member can be damped without increasing the weight of the vehicle body by providing the coupling member made of the fiber reinforced plastic that is an anisotropic material between the top portions of the suspension towers and the dash member.

DETAILED DESCRIPTION

Figure 1:
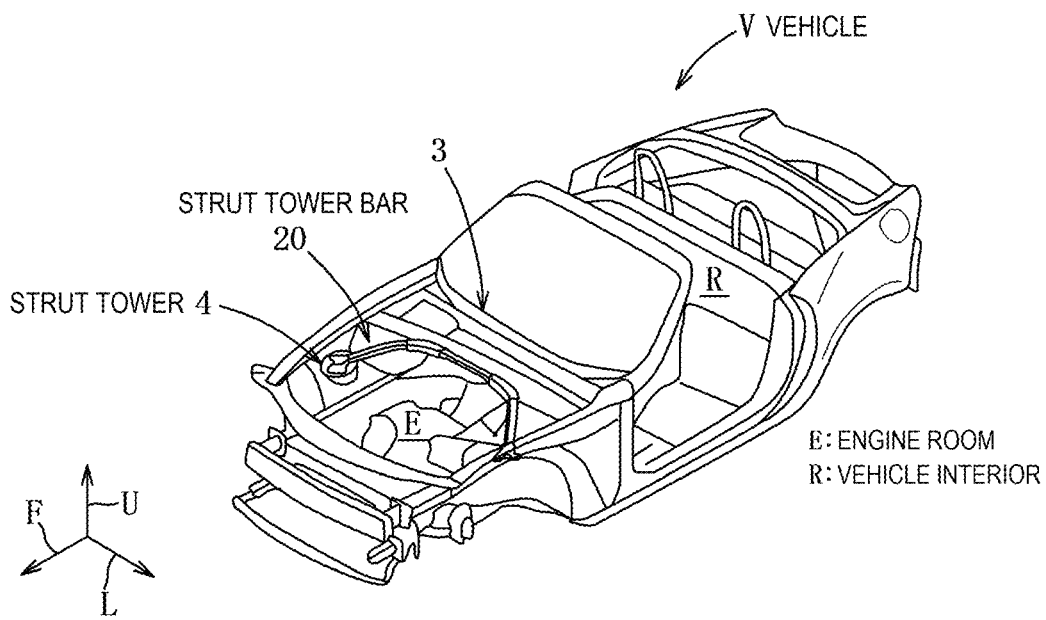
FIG. 1 is a diagram illustrating a vehicle according to a first example as seen from diagonally above.
Figure 2:
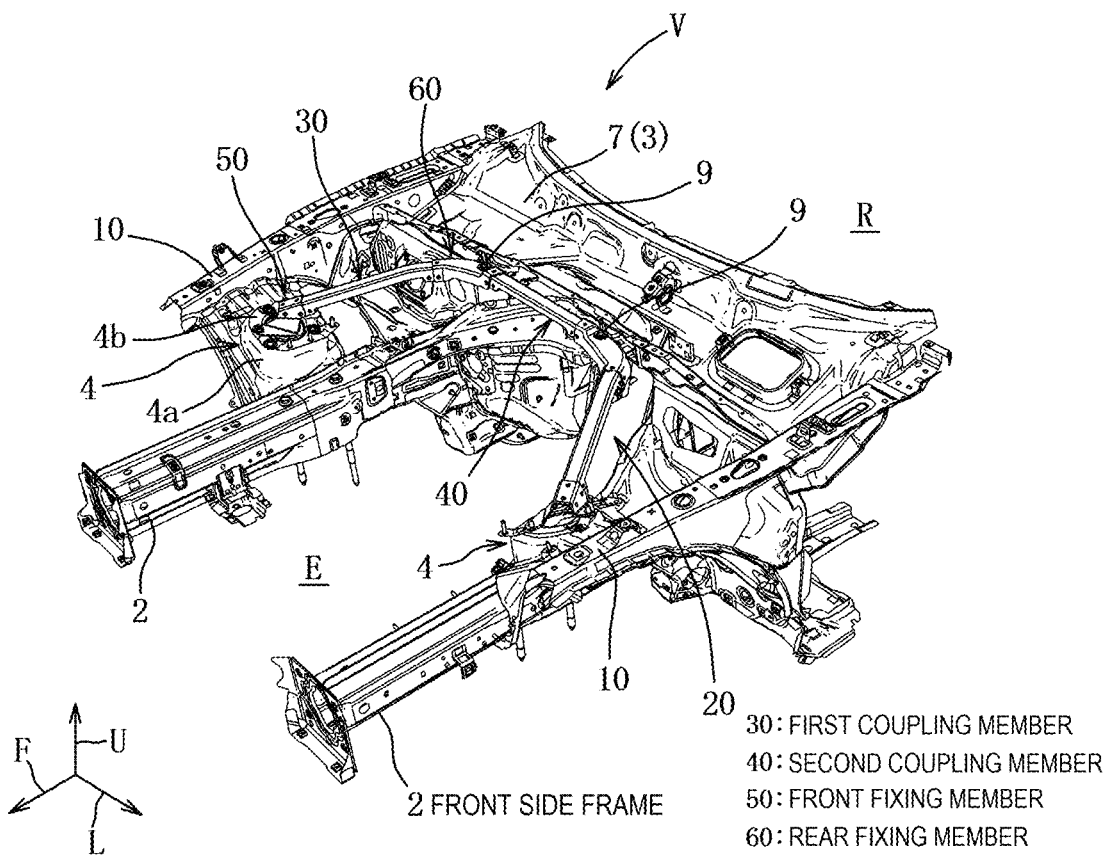
FIG. 2 is a perspective view of a front body structure.
Figure 3:
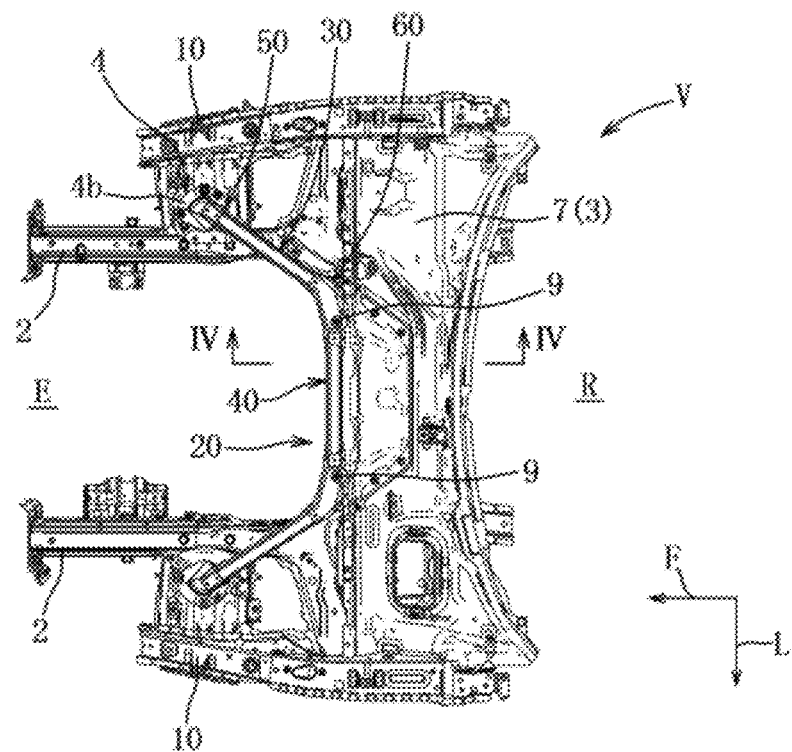
FIG. 3 is a plan view of the front body structure.

Embodiments will be described in detail with reference to the drawings. The following description applies embodiments to a lower body structure of a vehicle but is not limited thereto, the application thereof, or the use thereof.

Example 1

Example 1 will be described with reference to FIGS. 1 to 22. First, the overall structure of a vehicle V will be described. In the following description, it is assumed that the direction of arrow F is the front side, the direction of arrow L is the left side, and the direction of arrow U is the upper side.

As illustrated in FIGS. 1 to 4, the vehicle V is configured by a monocoque body and includes a floor panel that forms the bottom surface of a vehicle interior R, a dash panel 1, formed so as to rise up from the front end portion of this floor panel, that separates an engine room E from the vehicle interior R in the vehicle width direction, and a pair of left and right front side frames 2 extending forward from the front surface of this dash panel 1, and a pair of left and right rear side frames that extend backward from the rear end portion of the floor panel.

This vehicle V further includes a cowl portion 3, formed on the top of the dash panel 1, that extends in the vehicle width direction and a pair of left and right strut towers 4 (suspension tower members) that bulge toward the inside of the engine room E. This vehicle V may be equipped with an independent strut suspension.

The cowl portion 3 is formed in a tub shape by press-forming a steel plate. This cowl portion 3 mainly includes a cowl panel 5, a cowl member 6, projecting forward from the front end portion of the cowl panel 5, that forms a tub shaped structure in cooperation with the cowl panel 5, and a cowl grill 7 that partially covers the upper portions of the cowl panel 5 and the cowl member 6.

Figure 4:
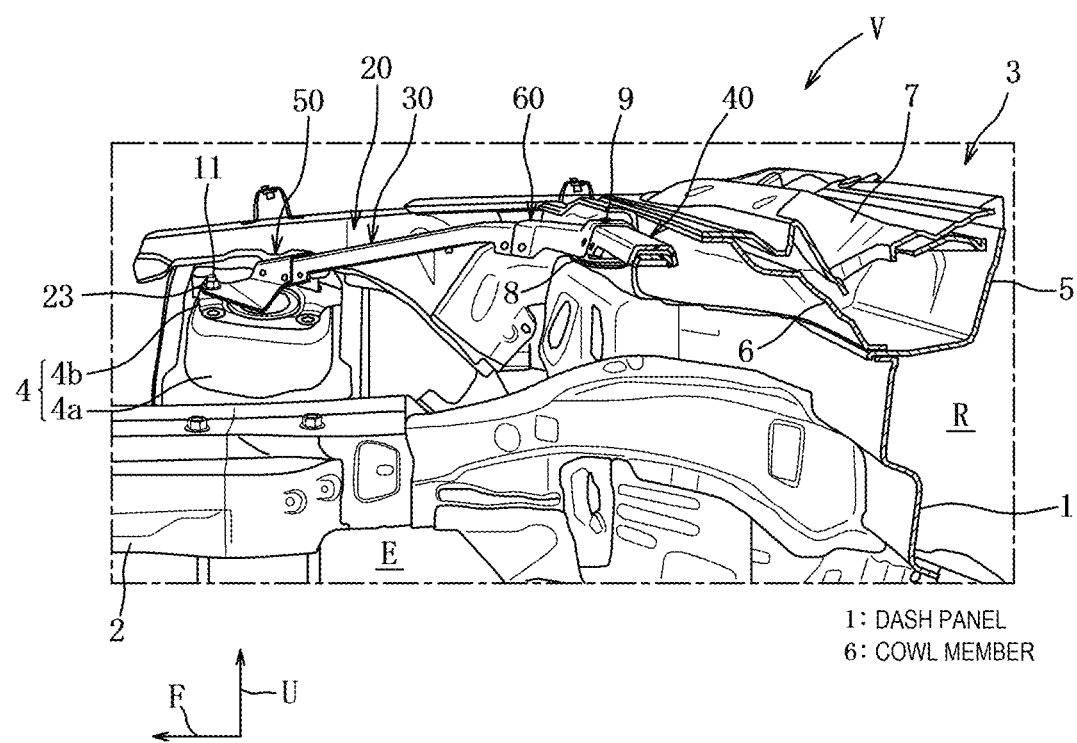
FIG. 4 is a sectional view taken along line IV-IV in FIG. 3.

As illustrated in FIG. 4, a pair of left and right mounting brackets 8 projecting forward are disposed in the left and right end portions of the front wall of the cowl member 6. The pairs of mounting brackets 8 are formed in a substantially partial ellipse in plan view and the stud bolts 9 extending vertically upward from the upper surfaces thereof are provided. It should be noted that the cowl member 6 can be formed integrally with the dash panel 1, so the dash panel 1 and the cowl member 6 correspond to the dash member.

As illustrated in FIGS. 1 to 4, the pair of the strut towers 4 project upward. Specifically, the strut towers 4 bulge into the engine room E from the wheel aprons hung between the apron reinforcements 10 and the front side frames 2 that extend forward and backward. Since the structure of the vehicle V is substantially symmetrical, the right side members and the right side structure will be mainly described below.

Each of the strut towers 4 includes a hollow cylindrical portion 4a having an axial center that shifts upward toward the rear side, and an annular top portion 4b that closes the upper end portion of this cylindrical portion 4a. A plurality of stud bolts 11 extending upward are erected on the top portion 4b. This strut tower 4 partially accommodates the upper portion of the damper mechanism (such as the damper and the spring) of the front suspension device. The spring seat coupled to the upper end portion of the damper mechanism is fastened and fixed to the top portion 4b by a plurality of fastening members via a mount rubber.

Next, a strut tower bar 20 will be described. As illustrated in FIGS. 1 to 4, this vehicle V is provided with the strut tower bar 20 that structurally couples the pair of strut towers 4 to the cowl member 6 via a plurality of fastening members. This strut tower bar 20 is substantially U-shaped in plan view and can suppress the behavior modes (the vehicle body torsional mode and the membrane vibration mode) of the vehicle body that affect the riding comfort.

Here, the behavior modes of the vehicle body will be described. The vehicle body torsional mode is a behavior mode used when the vehicle is turning.

Figure 5:
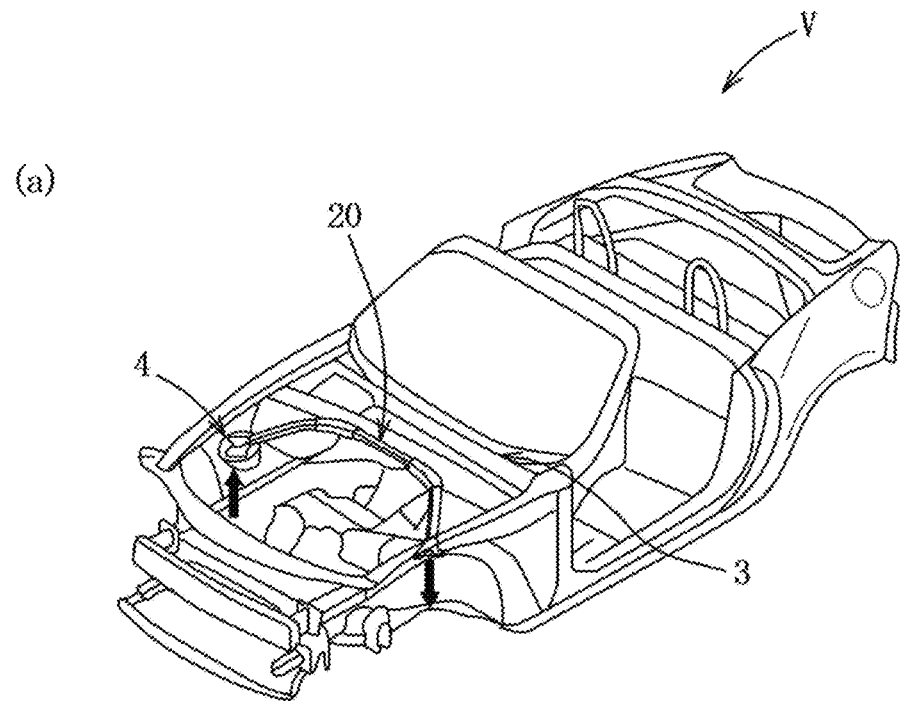
FIG. 5 illustrates explanatory diagrams of a body torsional mode and a membrane vibration mode of a vehicle body.
Figure 5:
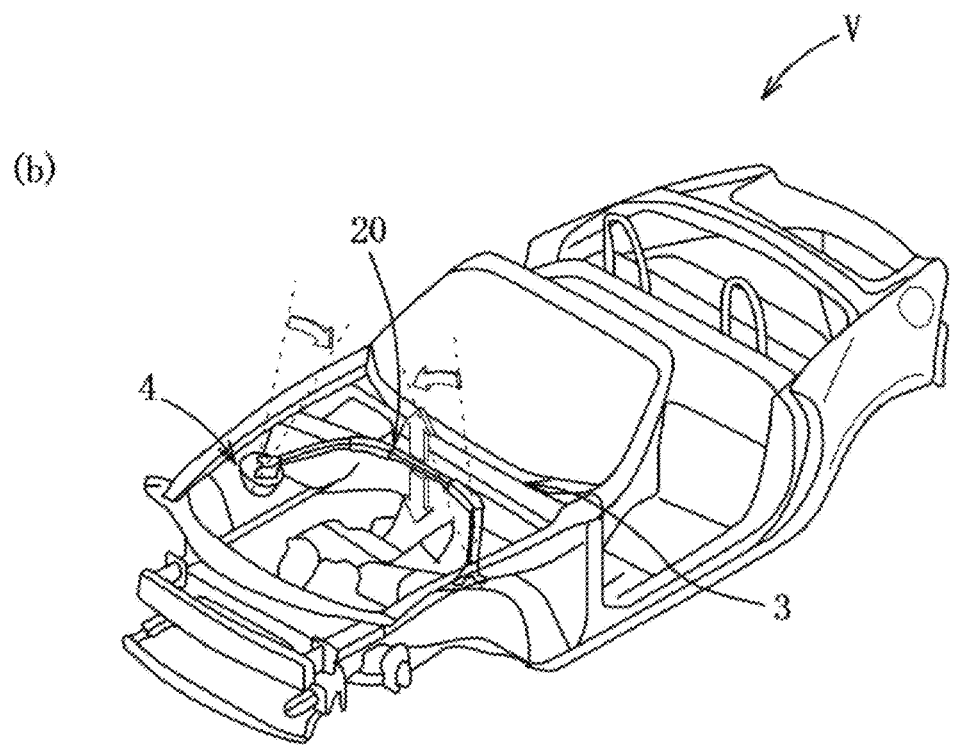

As illustrated by the arrow in (a) of FIG. 5, the top portions 4b of the strut towers 4 are displaced in the vertical direction due to the expansion and contraction of the damper mechanism when the vehicle is turning. The vehicle body torsional mode about the center axis of the vehicle body occurs due to the vertical displacement of the top portions 4b, causing degradation of steering stability.

The membrane vibration mode is a behavior mode used when the vehicle travels on a rough road surface. As illustrated by the arrow in (b) of FIG. 5, when the vehicle travels on a rough road surface, the strut towers 4 fall inward in the vehicle width direction while the cowl portion 3 is displaced in the vertical direction like a bow. The torsional displacement between the top portions 4b and the cowl portion 3 generates the membrane vibration mode on the panel member, especially on the floor panel having a large area, and causes degradation of riding comfort.

The strut tower bar 20 will be described again.

Figure 6:
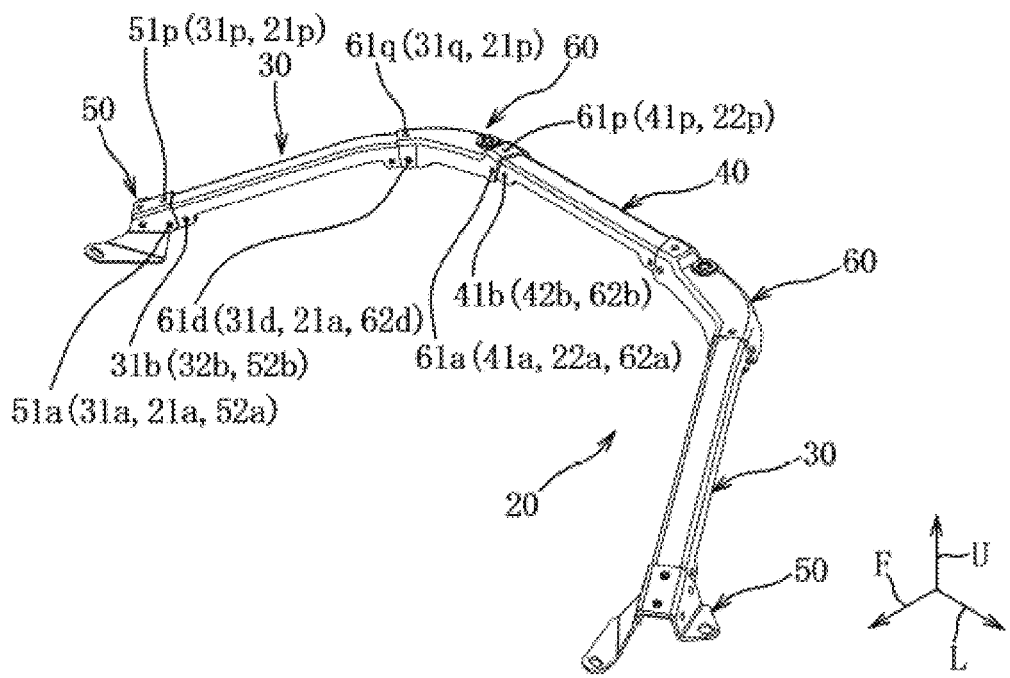
FIG. 6 is a perspective view of a strut tower bar.
Figure 7:
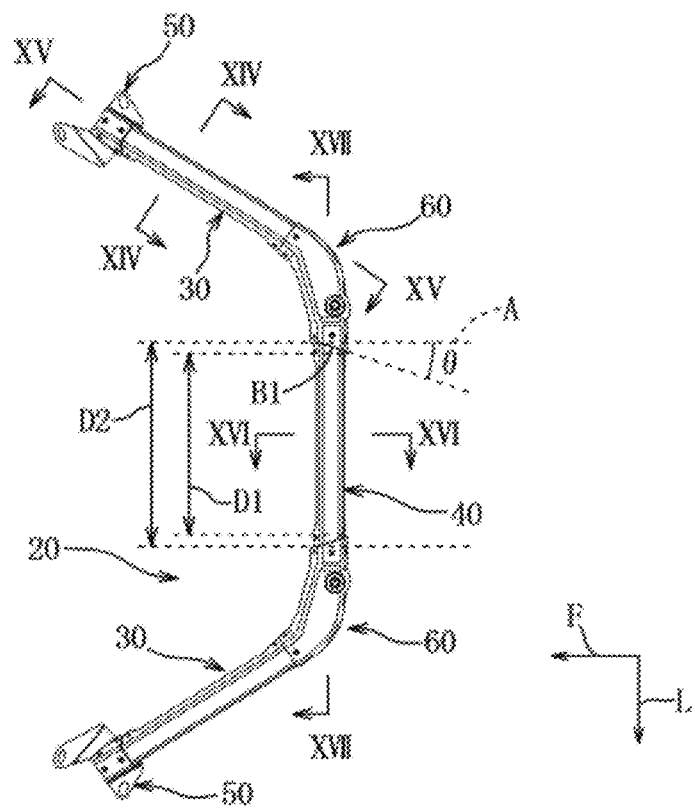
FIG. 7 is a plan view of the strut tower bar.
Figure 8:
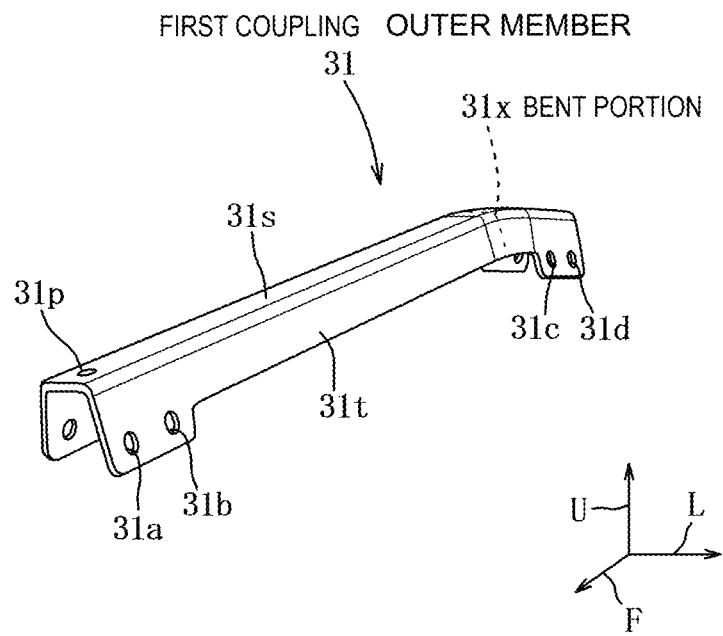
FIG. 8 is a perspective view of a first coupling outer member.
Figure 9:
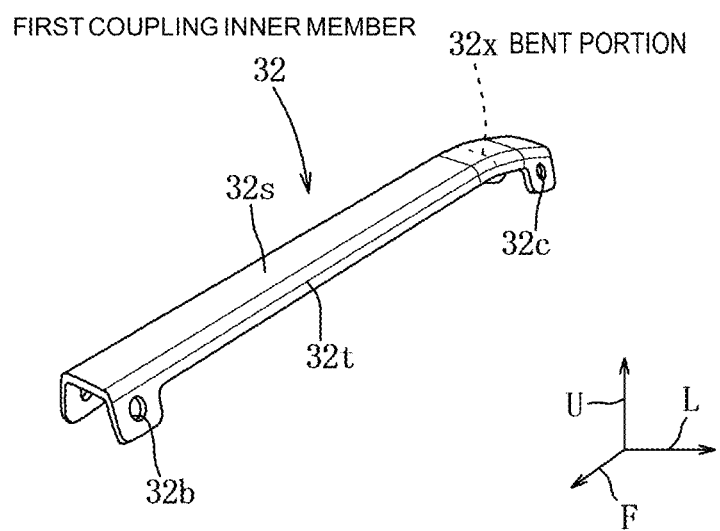
FIG. 9 is a perspective view of a first coupling inner member.

As illustrated in FIGS. 6 and 7, the strut tower bar 20 mainly includes a pair of left and right first coupling members 30 that shift to the inside in the vehicle width direction toward the rear side, a second coupling member 40, extending in the vehicle width direction, that couples the rear end portions of the pair of first coupling members 30, a pair of left and right front fixing members 50 that fix the front end portions of the pair of first coupling members 30 to the stud bolts 11 erected from the top portions 4b of the pair of strut towers 4 via fastening members 23, and a pair of left and right rear fixing members 60, connecting the rear end portions of the pair of first coupling members 30 and the left and right end portions of the second coupling members 40, that fasten and fix the connection portions thereof to the mounting brackets 8 via the stud bolts 9 and the tightening members.

The main material of the first coupling members 30 and the second coupling member 40 is carbon fiber reinforced plastic (CFRP) in which a reinforcing material (for example, carbon fiber) is impregnated with a synthetic resin (for example, thermosetting epoxy synthetic resin).

Carbon fiber includes a fiber bundle (tow) in which a predetermined number of single fibers continuously extending uniformly from one end to the other end in the longitudinal direction of the first coupling members 30 and the second coupling member 40 is bundled.

The front fixing members 50 and the rear fixing members 60 are made of an aluminum alloy material.

Accordingly, the front fixing members 50 and the rear fixing members 60 have bending rigidity and torsional rigidity that are larger than in the first coupling members 30 and the second coupling member 40.

The plate materials of the first coupling members 30 and the second coupling member 40 include three types of layered portions.

Figure 18:
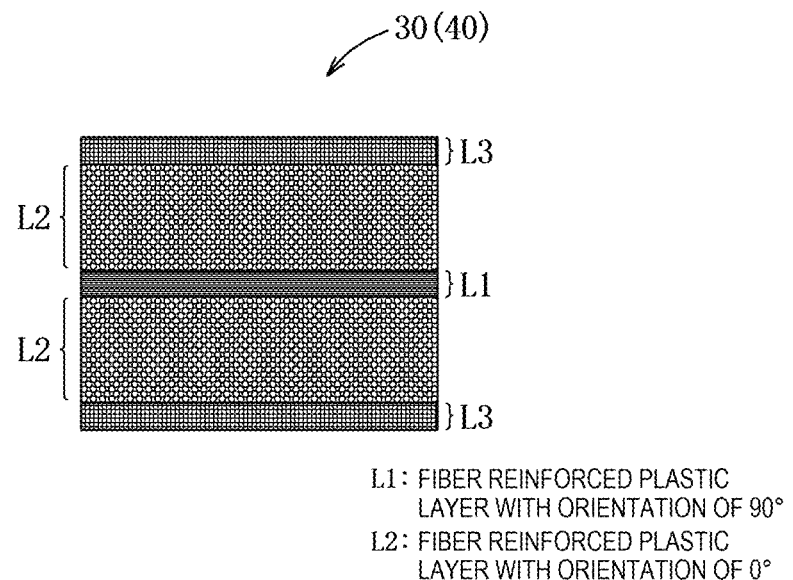
FIG. 18 is an enlarged sectional view of the first coupling outer member.

As illustrated in FIG. 18, the first coupling members 30 and the second coupling member 40 have a middle layer portion L1 disposed in the middle portion in the thickness direction, main body layer portions L2 that sandwich the middle layer portion L1, and surface layer portions L3 that cover the surfaces of the main body layer portions L2 on respective sides of the middle layer portion L1. The surface layer portions L3 provide corrosion resistance (electrolytic corrosion resistance).

The middle layer portion L1 is a fiber reinforced plastic layer having an orientation of 90° in which the carbon fibers extend orthogonally to the longitudinal direction. The main body layer portions L2 are each a fiber reinforced plastic layer having an orientation of 0° in which the carbon fibers described above extend in the longitudinal direction. The surface layer portions L3 area each a glass fiber reinforced plastic (GFRP) layer in which woven glass fibers are impregnated with a synthetic resin. The volume ratio (L1 to L2 to L3) of these layers are set to, for example, 7 to 80 to 13. In other words, the volume ratio of L1 to L3 may be within a same order of magnitude and between L1 to L2 may be an order of magnitude.

Next, the first coupling member 30 will be described.

As illustrated in FIGS. 8, 9, 14, and 15, the first coupling member 30 includes a first coupling outer member 31 that has a substantially U-shaped cross section orthogonal to the longitudinal direction and a first coupling inner member 32, forming a closed cross section C1 extending in the longitudinal direction in cooperation with the first coupling outer member 31 in an intermediate portion in the longitudinal direction, that has a substantially U-shaped cross section. The first coupling outer member 31 has open cross sections in both end portions in the longitudinal direction. The closed cross section C1 is asymmetric with respect to a middle line C of the cross section orthogonal to the longitudinal direction in the cross section. Accordingly, when a bending load is input to the first coupling member 30, the bending load is converted to torsional displacement of the first coupling member 30.

The first coupling outer member 31 includes an upper wall portion 31s and a pair of side wall portions 31t, extending downward from both end portions parallel to the longitudinal direction of the upper wall portion 31s.

Of each of the side wall portions 31t, the front portion and the rear portion in the longitudinal direction are set to have larger widths (vertical dimensions) than the intermediate portion. Openings 31a and 31b are formed in the front portions of the pair of side wall portions 31t in the order from the front and openings 31c and 31d are formed in the rear portions of the pair of side wall portions 31t in the order from the front. An opening 31p is formed at the position corresponding to the opening 31a in the front portion of the upper wall portion 31s and an opening 31q is formed at the position corresponding to the opening 31d in the rear portion of the upper wall portion 31s. A bent portion 31x that projects upward and extends in the left-right direction is formed in an intermediate portion of the rear side of the upper wall portion 31s.

The first coupling inner member 32 may be shorter in the longitudinal dimension than the first coupling outer member 31. The first coupling inner member 32 includes an upper wall portion 32s and a pair of side wall portions 32t, extending downward from both end portions that are parallel to the longitudinal direction of the upper wall portion 32s.

Of each of the side wall portions 32t, the front portion and the rear portion in the longitudinal direction are set to have larger widths than the intermediate portion. Openings 32b are formed at positions corresponding to the openings 31b in the front portions of the pair of side wall portions 32t and openings 32c are formed at positions corresponding to the openings 31c in the rear portions of the pair of side wall portions 32t. A bent portion 32x that projects upward and extends in the left-right direction is formed at a position corresponding to the bent portion 31x in an intermediate portion of the rear side of the upper wall portion 32s. Adjusting members 21 having a substantially U-shaped cross section are disposed in both end portions in the longitudinal direction of the first coupling inner member 32.

Next, the second coupling member 40 will be described.

Figure 16:
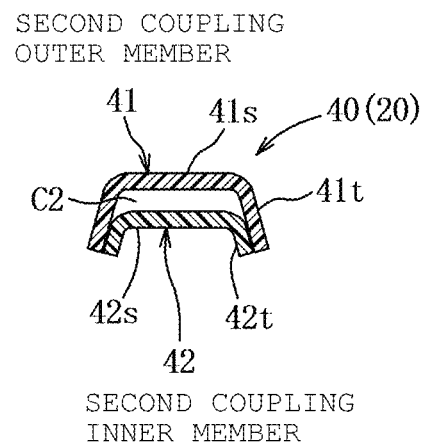
FIG. 16 is a sectional view taken along line XVI-XVI in FIG. 7.
Figure 17:
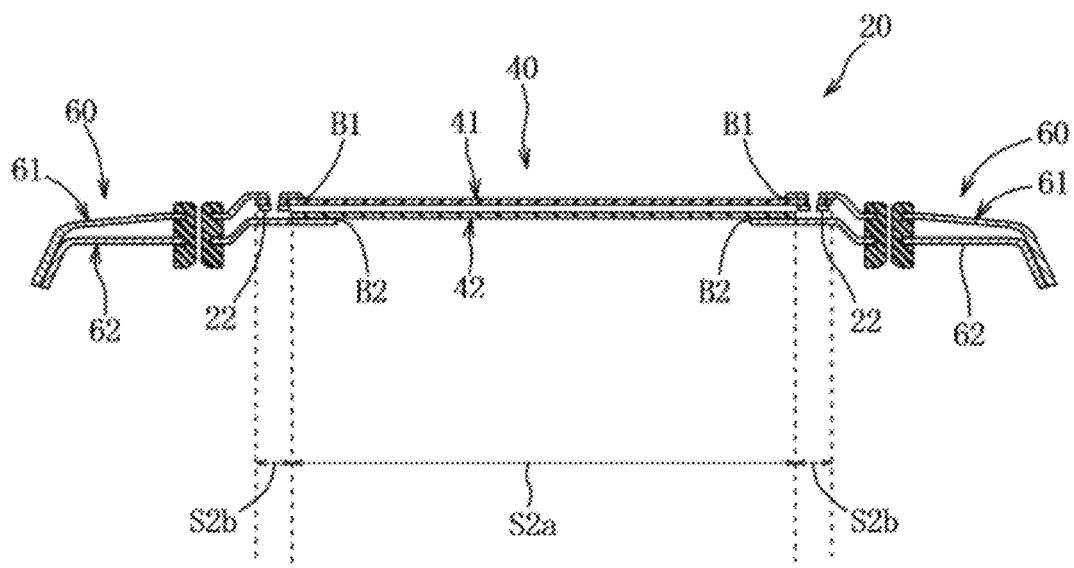
FIG. 17 is a sectional view taken along line XVII-XVII in FIG. 7.

As illustrated in FIGS. 16 and 17, the second coupling member 40 may be made of the same material as the first coupling member 30 and may include a second coupling outer member 41 having a substantially U-shaped cross section orthogonal to the longitudinal direction and a second coupling inner member 42, having a substantially U-shaped cross section, that forms a closed cross section C2 extending in the longitudinal direction in an intermediate portion in the longitudinal direction in cooperation with the second coupling outer member 41. The second coupling outer member 41 may have open cross sections in both end portions in the longitudinal direction. The closed cross section C2 is symmetric with respect to the middle line of the cross section orthogonal to the longitudinal direction in the cross section and has a substantially trapezoidal shape. This increases the bending rigidity of the second coupling member 40.

The second coupling outer member 41 may include an upper wall portion 41s and a pair of side wall portions 41t extending downward from both end portions parallel to the longitudinal direction of the upper wall portion 41s.

Of each of the side wall portions 41t, the left portion and the right portion in the longitudinal direction are set to have larger widths than an intermediate portion. An opening 41a on the outer side in the vehicle width direction and an opening 41b on the inner side in the vehicle width direction are formed in the right portion and the left portion of the pair of side wall portions 41t, respectively, and openings 41p are formed at positions corresponding to the opening 41a in the right end portion and the left end portion of the upper wall portion 41s (see FIG. 6).

As illustrated in FIG. 17, the second coupling inner member 42 may be shorter in the longitudinal direction than the second coupling outer member 41. The second coupling inner member 42 may have an upper wall portion 42s and a pair of side wall portions 42t extending downward from both end portions parallel to the longitudinal direction of the upper wall portion 42s. Of the side wall portions, the front portion and the rear portion in the longitudinal direction may have larger widths than an intermediate portion. In the front portions of the pair of the side wall portions, openings 42b may correspond to the opening 41b (see FIG. 6). The adjusting members 22 having a substantially U-shaped cross section may be disposed in both end portions in the longitudinal direction of the second coupling inner member 42.

Next, the front fixing member 50 will be described.

Figure 10:
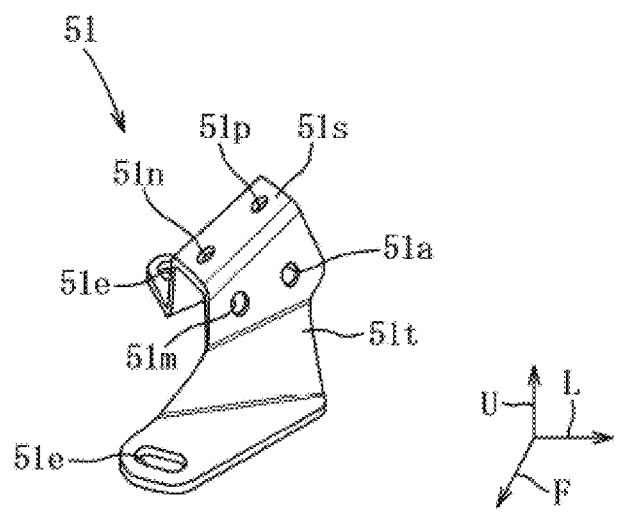
FIG. 10 is a perspective view of a front fixing outer member.
Figure 11:
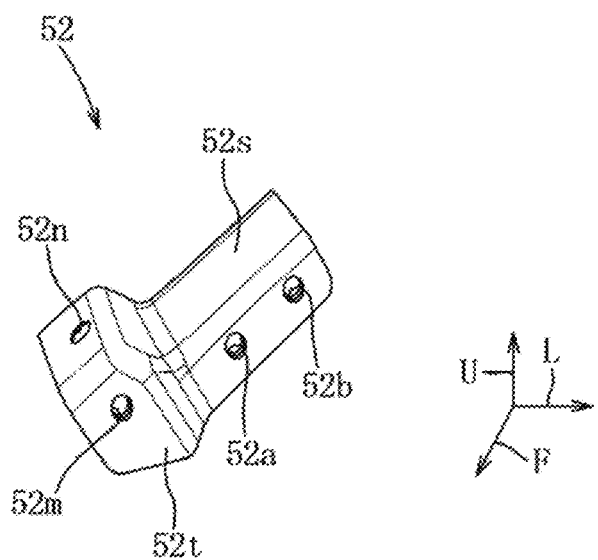
FIG. 11 is a perspective view of a front fixing inner member.
Figure 15:
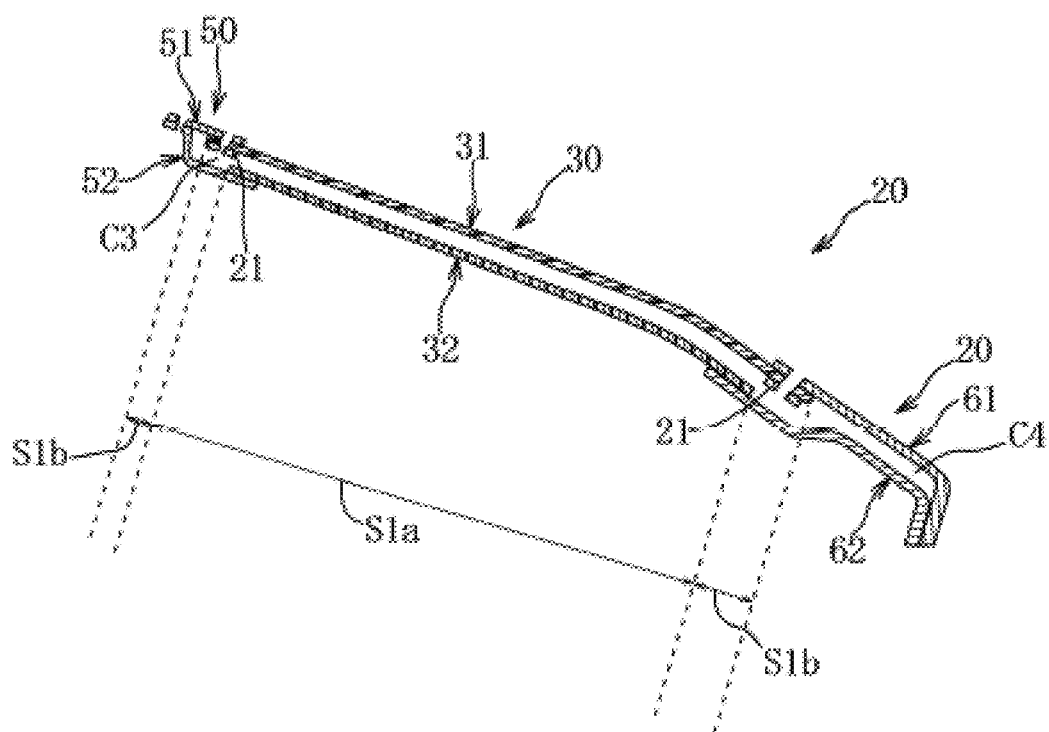
FIG. 15 is a sectional view taken along the line XV-XV in FIG. 7.

As illustrated in FIGS. 10, 11, and 15, the front fixing member 50 may include a front fixing outer member 51 that is substantially hat-shaped in a cross section orthogonal to the longitudinal direction and a front fixing inner member 52, having substantially U-shaped cross section, that forms a closed cross section C3 extending in the longitudinal direction in the front portion in the longitudinal direction in cooperation with the front fixing outer member 51. The front fixing outer member 51 may be shorter in the longitudinal direction than the front fixing inner member 52. The closed cross section C3 of the front fixing member 50 may extend in the longitudinal direction and correspond to an open cross section region S1b of the first coupling member 30. An open cross section of the front fixing member 50 may continue to the rear side of the closed cross section C3 and correspond to a closed cross section region S1a of the first coupling member 30.

The front fixing outer member 51 may include an upper wall portion 51s and a pair of side wall portions 51t extending downward from both end portions parallel to the axis of the upper wall portion 51s and then extending away from the axis.

In the vertical portions of the side wall portions 51t corresponding to wall portions that form the closed cross section, openings 51m and openings 51a may be formed in the order from the front. In the horizontal portions that correspond to the flange portions, openings 51e are formed. In the upper wall portion 51s, an opening 51n and an opening 51p are formed at positions corresponding to the openings 51m and the openings 51a, respectively. It should be noted that stud bolts 11 are inserted into the openings 51e.

The front fixing inner member 52 may have an upper wall portion 52s and a pair of side wall portions 52t extending downward from both end portions of the upper wall portion 52s that are parallel to the longitudinal direction. Each of the side wall portions 52t may have an opening 52m that corresponds to the opening 51m, an opening 52a that corresponds to the opening 51a, and an opening 52b that corresponds to the opening 31b (opening 32b) behind the opening 52a. An opening 52n may correspond to the opening 51n in front of the upper wall portion 52s.

Next, the rear fixing member 60 will be described.

As illustrated in FIGS. 12, 13, 15, and 17, the rear fixing member 60 may include a rear fixing outer member 61 that has a substantially U-shaped cross section orthogonal to the longitudinal direction and a rear fixing inner member 62 having a substantially U-shaped cross section that forms a closed cross section C4 extending in the longitudinal direction in cooperation with the rear fixing outer member 61. The rear fixing outer member 61 may be shorter in the longitudinal direction than the rear fixing inner member 62. The outer portion in the vehicle width direction of the closed cross section C4 of the rear fixing member 60 may correspond to the open cross section region S1b of the first coupling member 30 and the inner portion in the vehicle width direction of the closed cross section C4 of the rear fixing member 60 may correspond to an open cross section region S2b of the second coupling member 40.

In addition, the open cross section outside in the vehicle width direction of the rear fixing member 60 may correspond to the closed cross section region S1a of the first coupling member 30 and the open cross section inside in the vehicle width direction of the rear fixing member 60 may correspond to a closed cross section region S2a of the second coupling member 40.

The rear fixing outer member 61 has an upper wall portion 61s and a pair of side wall portions 61t extending downward from both end portions parallel to the longitudinal direction of the upper wall portion 61s.

Each of the side wall portions 61t may have an opening 61d corresponding to the opening 31d outside in the vehicle width direction and an opening 61a corresponding to the opening 41a inside in the vehicle width direction.

The upper wall portion 61s may have an opening 61q corresponding to the opening 31q, an opening 61p corresponding to the opening 41p, and a stud hole 61r disposed in an intermediate portion.

The rear fixing inner member 62 may have an upper wall portion 62s and a pair of side wall portions 62t extending downward from both end portions parallel to the longitudinal direction of the upper wall portion 62s. In each of the side wall portions 62t, an opening 62c corresponding to the opening 31c, an opening 62d corresponding to the opening 31d, an opening 62a corresponding to the opening 41a, and an opening 62b corresponding to the opening 41b may be formed in the order from the outside in the vehicle width direction. A stud hole 62r corresponding to the stud hole 61r is provided in the upper wall portion 62s. The stud bolts 9 are inserted into the openings 61r and 62r.

Figure 12:
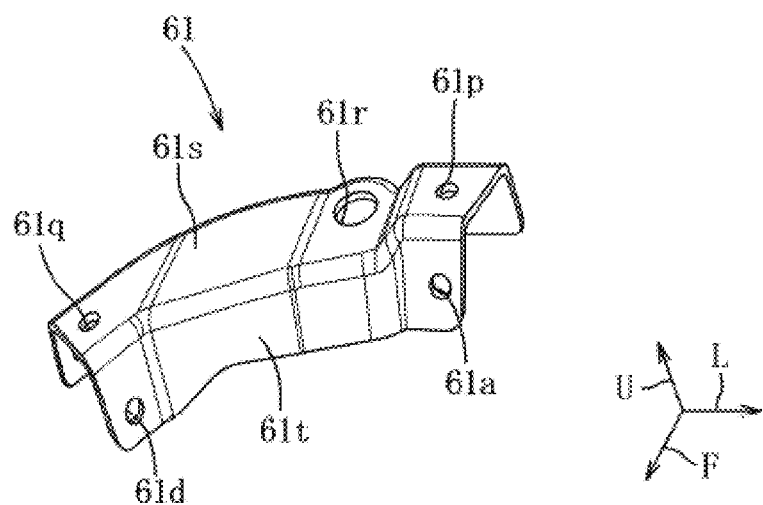
FIG. 12 is a perspective view of a rear fixing outer member.
Figure 13:
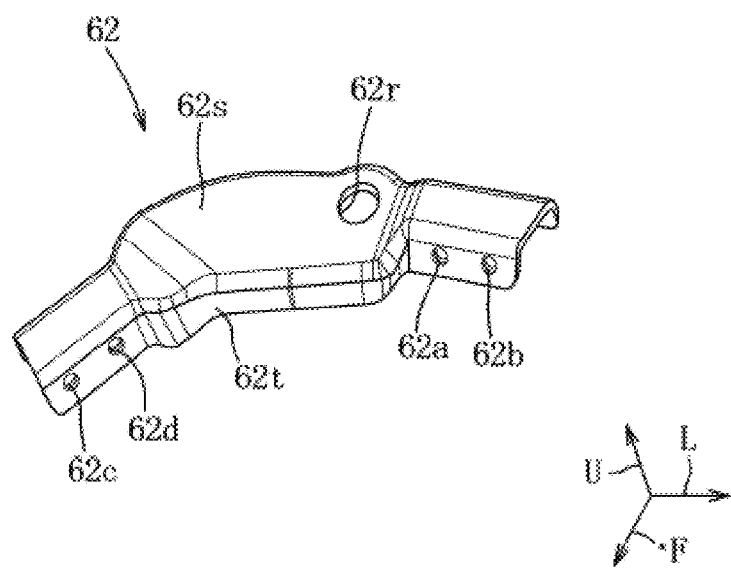
FIG. 13 is a perspective view of a rear fixing inner member.
Figure 14:
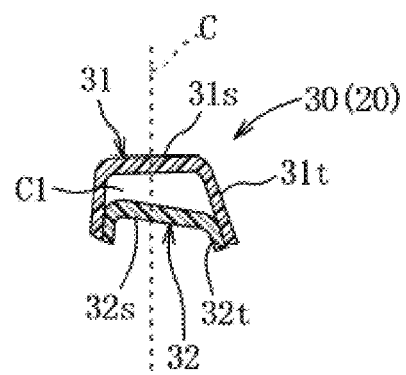
FIG. 14 is a sectional view taken along line XIV-XIV in FIG. 7.

As illustrated in FIGS. 12 and 13, the end portion inside in the vehicle width direction of the rear fixing outer member 61 and the end portion inside in the vehicle width direction of the rear fixing inner member 62 may be substantially parallel to each other in plan view.

As illustrated in FIG. 17, boundary portions B1 between the end portions inside in the vehicle width direction of the rear fixing outer member 61 and the second coupling outer member 41 is disposed outside in the vehicle width direction of boundary portions B2 between the end portions inside in the vehicle width direction of the rear fixing inner member 62 and the second coupling inner member 42 in plan view.

As illustrated in FIG. 7, the pair of left and right boundary portions B1 (B2) are inclined.

When the cowl portion 3 is displaced in the vertical direction like a bow with the strut tower bar 20 attached to the vehicle body, the boundary portion B1 (B2) intersects a neutral axis A at a predetermined angle θ. The distance between the pair of boundary portions B1 (B2) is formed so that a distance D1 between the boundary portions on the rear side closest to the cowl portion 3 is the shortest and a distance D2 between the boundary portions on the front side farthest from the cowl portion 3 is the longest. It should be noted that the neutral axis A is a line in which the neutral plane of the second coupling member 40 intersects the cross section orthogonal to the longitudinal direction.

Next, the assembly process of the strut tower bar 20 will be described.

Figure 19:
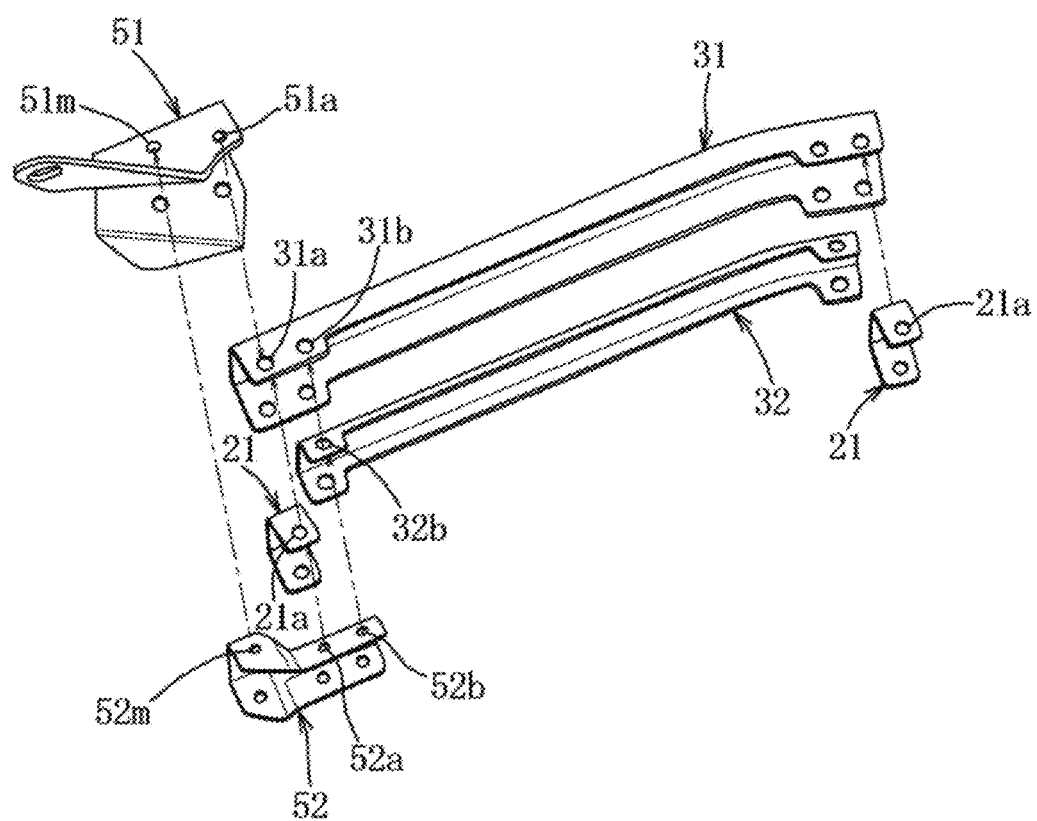
FIG. 19 is an exploded perspective view of the first coupling member and the front fixing member.

As illustrated in FIG. 19, in the first coupling member 30, after the openings 31b and 31c are aligned with the opening 32b and 32c, respectively, and then the first coupling inner member 32 is fitted and fixed to the first coupling outer member 31 with an adhesive so as to form the closed cross section C1. A pair of adjusting members 21 are disposed on one end side and the other end side in the longitudinal direction of the first coupling inner member 32, respectively. An opening 21p may be formed in the upper wall portion of each of the adjusting members 21 and openings 21a are formed in the side wall portions of each of the adjusting members 21.

The pair of adjusting members 21 may be positioned so that the openings 21a correspond to the openings 31a and 31d of the first coupling outer member 31 and the openings 21p corresponds to the openings 31p and 31q.

The second coupling outer member 41 may be fitted and fixed to the second coupling inner member 42 to form the closed cross section C2 in substantially the same procedure.

The pair of the adjusting members 22 may disposed on a first end side and a second end side in the longitudinal direction of the second coupling inner member 42, respectively. The opening 22p may be formed in the upper wall portion of each of the adjusting members 22 and openings 22a may be formed in the side wall portions of each of the adjusting members 22. The pair of adjusting members 22 may be positioned so that the openings 22a correspond to the openings 41a of the second coupling outer member 41 and the openings 22p correspond to the openings 41p.

The front fixing outer member 51 may cover the end portion of the first coupling outer member 31 from above and the front fixing inner member 52 may cover the adjusting members 21 and the first coupling inner member 32 from below, so that the front fixing outer member 51 and the front fixing inner member 52 form the closed cross section C3 and the open cross section. Since the front fixing member 50 surrounds the first coupling member 30 from the outer circumference, the front fixing member 50 has a larger cross-sectional area than the first coupling member 30 and has a larger moment of inertia of area and a larger polar moment of inertia of area than the first coupling member 30.

The opening 51n may coincide with the opening 52n and the opening 51m may coincide with the opening 52m. Since the openings 51a and 51p of the front fixing outer member 51 and the openings 52a and 52b of the front fixing inner member 52 are fixed to the first coupling member 30 via screws or the like, the openings are equivalent to fixing portions. The openings 51a, 51p, and 52a may correspond to the open cross section region S1b of the first coupling member 30 and the opening 52b may correspond to the closed cross section region S1a of the first coupling member 30.

As illustrated in FIG. 15, the strut tower bar 20 has a thickness corresponding to the two plates (the first coupling outer member 31 and the first coupling inner member 32) in an intermediate portion in the longitudinal direction of first coupling member 30, has a thickness corresponding to the three plates (the first coupling outer member 31, the first coupling inner member 32, and the front fixing inner member 52) in front of this portion, and has a thickness corresponding to the four plates (the front fixing outer member 51, the first coupling outer member 31, the first coupling inner member 32, and the front fixing inner member 52) further in front of this portion.

In addition, the strut tower bar 20 has a thickness corresponding to the four plates (the front fixing outer member 51, the first coupling outer member 31, the adjusting member 21, and the front fixing inner member 52) further in front of this portion, has a thickness corresponding to the three plates (the front fixing outer member 51, the first coupling outer member 31, and the front fixing inner member 52) further in front of this portion, and has a thickness corresponding to the two plates (the front fixing outer member 51 and the front fixing inner member 52) further in front of this portion.

The rear fixing outer member 61 may cover the end portion of the first coupling outer member 31 from above and the rear fixing inner member 62 may cover the adjusting member 25 and the first coupling inner member 32 from below, so that the rear fixing outer member 61 and the rear fixing inner member 62 form the closed cross section C4 and the open cross section. Since the rear fixing member 60 surrounds the first coupling member 30 from the outer circumference, the rear fixing member 60 has a larger cross-sectional area than the first coupling member 30 and has a larger moment of inertia of area and a larger polar moment of inertia of area than the first coupling member 30. Since the openings 61d and 61q of the rear fixing outer member 61 and the openings 62c and 62d of the rear fixing inner member 62 are fixed to the first coupling member 30 via screws or the like, the openings are equivalent to fixing portions.

As illustrated in FIG. 15, the strut tower bar 20 has a thickness corresponding to the two plates (the first coupling outer member 31 and the first coupling inner member 32) in an intermediate portion in the longitudinal direction of first coupling member 30, has a thickness corresponding to the three plates (the first coupling outer member 31, the first coupling inner member 32, and the rear fixing inner member 62) further behind this portion, and has a thickness corresponding to the four plates (the rear fixing outer member 61, the first coupling outer member 31, the adjusting member 25, and the rear fixing inner member 62) further behind this portion.

The strut tower bar 20 has a thickness corresponding to the three plates (the rear fixing outer member 61, the first coupling outer member 31, and the rear fixing inner member 62) further behind this portion and has a thickness corresponding to the two plates (the rear fixing outer member 61 and the rear fixing inner member 62) further behind this portion.

In addition, the rear fixing outer member 61 covers the end portion of the second coupling outer member 41 from above and the rear fixing inner member 62 covers the adjusting member 22 and the second coupling inner member 42 from below, so that the rear fixing outer member 61 and the rear fixing inner member 62 form the closed cross section C4 and the open cross section. Since the rear fixing member 60 surrounds the second coupling member 40 from the outer circumference, the rear fixing member 60 has a larger cross-sectional area than the second coupling member 40 and has a larger moment of inertia of area and a larger polar moment of inertia of area than the second coupling member 40. Since the openings 61a and 61q of the rear fixing outer member 61 and the openings 62a and 62b of the rear fixing inner member 62 are fixed to the second coupling member 40 via screws or the like, the openings are equivalent to fixing portions.

As illustrated in FIG. 17, the strut tower bar 20 has a thickness corresponding to the two plates (the second coupling outer member 41 and the second coupling inner member 42) in an intermediate portion in the longitudinal direction of the second coupling member 40, has a thickness corresponding to the three plates (the second coupling outer member 41, the second coupling inner member 42, and the rear fixing inner member 62) further outside in the vehicle width direction, and has a thickness corresponding to the four plates (the rear fixing outer member 61, the first coupling outer member 31, the second coupling inner member 42, and the rear fixing inner member 62) further outside in the vehicle width direction. The strut tower bar 20 has a thickness corresponding to the four plates (the rear fixing outer member 61, the first coupling outer member 31, the adjusting member 27, and the rear fixing inner member 62) further outside in the vehicle width direction, has a thickness corresponding to the three plates (the rear fixing outer member 61, the first coupling outer member 31, and the rear fixing inner member 62) further outside in the vehicle width direction, and has a thickness corresponding to the two plates (the rear fixing outer member 61 and the rear fixing inner member 62) further outside in the vehicle width direction.

Accordingly, the thickness of the strut tower bar 20 only changes within two plates when viewed in the longitudinal direction. In other words, since change in the member rigidity in the longitudinal direction is suppressed in the strut tower bar 20, the occurrence of local displacement due to the vehicle body behavior mode can be suppressed.

Next, the operation and effect of the front body structure of the vehicle V according to the embodiment will be described.

In describing the operation and effect, the deformation behavior of the vehicle V in the membrane vibration mode has been analyzed by computer aided engineering (CAE).

First, the basic concept of this analysis will be described.

Three types of structural analysis models of carbon fiber reinforced plastic plates with a size of 25 mm×250 mm×2.0 mm were set and the comparative verification of the bending rigidity and the vibration damping performance were performed.

Model M1 is configured entirely by a carbon fiber reinforced plastic layer having an orientation of 0°. In addition, 87% of model M2 is a carbon fiber reinforced plastic layer having an orientation of 0° and 13% of model M2 is a glass fiber reinforced plastic layer having an orientation of 0°, on both surfaces of this carbon fiber reinforced plastic layer. As in the embodiment, 7% of model M3 is the carbon fiber reinforced plastic layer having an orientation of 90°, in the center, 80% of model M3 is the carbon fiber reinforced plastic layer having an orientation of 0°, on the surface of the carbon fiber reinforced plastic layer having an orientation of 90°, e.g., on both surfaces of the carbon fiber reinforced plastic layer having an orientation of 90°, and 13% of model M3 is a glass fiber reinforced plastic layer, on the surface of the carbon fiber reinforced plastic layer having an orientation of 0°, e.g., on the surface of each of carbon fiber reinforced plastic layer having an orientation of 0° opposite the carbon fiber reinforced plastic layer having an orientation of 90°.

Figure 20:
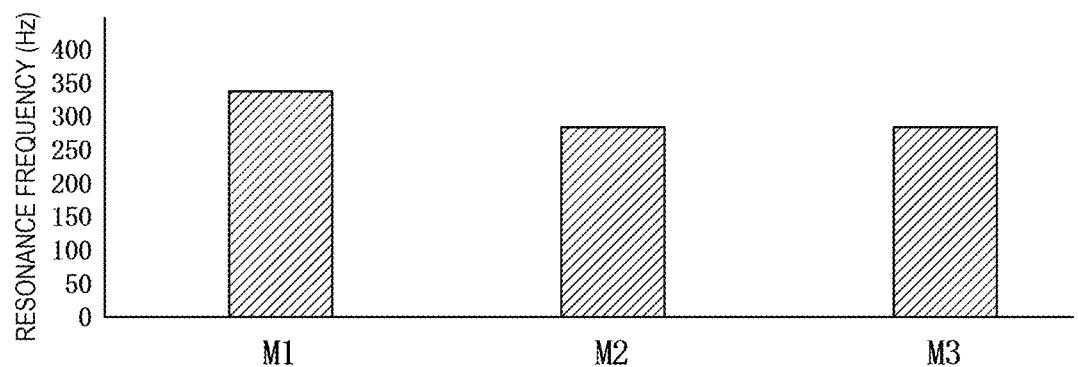
FIG. 20 is a graph illustrating the results of comparative verification of the bending rigidity.

FIG. 20 illustrates the verification results of bending rigidity. It should be noted that the higher the resonance frequency, the higher the bending rigidity.

Model M2 has a lower bending rigidity than the model M1 as illustrated in FIG. 20, but measures against electrolytic corrosion are an essential to ensure reliability at the time of implementation. Model M3 has a bending rigidity that is substantially the same as model M2 and can also ensure large load/fatigue durability.

Figure 21:
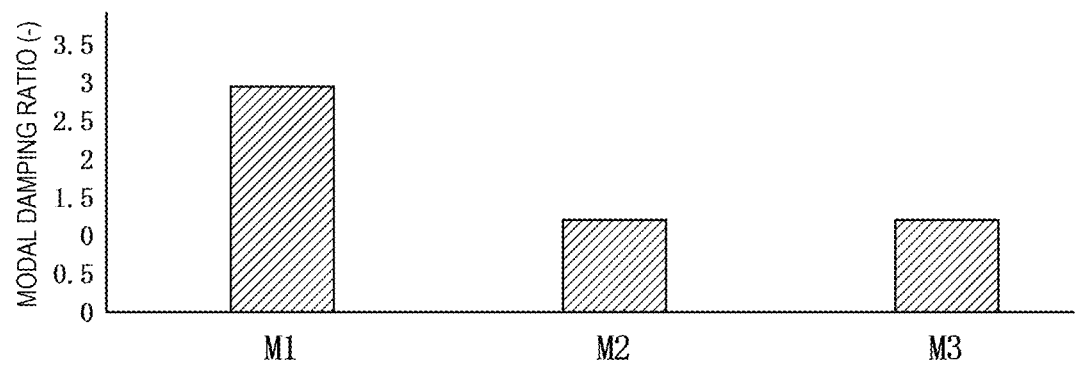
FIG. 21 is a graph illustrating the results of comparative verification of the vibration attenuation performance.

FIG. 21 illustrates the verification results of the vibration damping performance. It should be noted that the higher the modal damping ratio, the larger the amount of accumulated strain energy and the higher the vibration damping effect.

As illustrated in FIG. 21, model M2 has lower vibration damping performance than model M1, but measures against electrolytic corrosion are essential. Model M3 has vibration damping performance that is substantially the same as model M2 and can also ensure large loads/fatigue durability. As described above, the compatibility between the practical utility and the suppressive effects of the body torsional mode and the membrane vibration mode was confirmed.

Since the front body structure of the vehicle V is provided with the first coupling members 30 that couple the cowl member 6 to the strut towers 4, the vertical displacement of the top portions 4b of the strut towers 4 can be reduced and the body torsional mode can be suppressed by using the bending rigidity of the first coupling members 30. Since each of the first coupling members 30 has the reinforced layer portion made of the fiber reinforced plastic in which fibers are impregnated with the synthetic resin material and the fibers of the reinforced layer portion are oriented so that the fibers extending in a longitudinal direction are more than the fibers extending in directions other than the longitudinal direction, the torsional displacement between the top portions of the strut towers 4 and the cowl member 6 can be converted to the torsional displacement of the first coupling members 30 and the membrane vibration mode is suppressed by increasing the vibration damping capacity of the vehicle V. The torsional displacement of the first coupling member 30 is converted to strain energy and kinetic energy and this strain energy is temporarily stored in the synthetic resin material of the first coupling members 30 as shear strain. After that, the stored strain energy (shear strain) is converted to kinetic energy again and part thereof is dissipated as thermal energy.

The front body structure includes the pair of left and right first coupling members 30 that couple the cowl member 6 to the pair of strut towers 4, the second coupling member 40 that couples the rear end portions of the pair of first coupling members 30 to each other, the pair of left and right front fixing members 50 that fix the front end portions of the pair of first coupling members 30 to the pair of strut towers 4, and the pair of left and right rear fixing members that connect, at connection portions, the rear end portions of the pair of first coupling members 30 to the side end portions of the second coupling member 40 and fixes the connecting portions to the cowl member 6, in which the pair of first coupling members 30 and the second coupling member 40 are substantially U-shaped in plan view.

Accordingly, the pair of left and right first coupling members 30 can be configured as a single component and the ease of handling can be improved. In addition, the coupling members 21 and 22 can be formed long linearly and the anisotropy tendency of the coupling members 21 and 22 can be increased.

Figure 22:
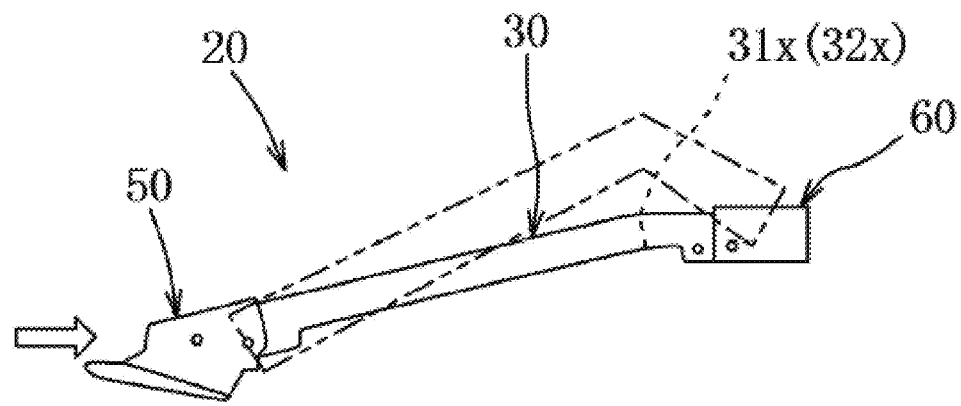
FIG. 22 is an explanatory diagram of the behavior of the first coupling member at the time of a vehicle collision.

Since the first coupling member 30 has the bent portion 31x (32x) that projects upward and extends in the vehicle width direction as illustrated by the double chain line in FIG. 22, the broken portion of the first coupling member 30 can be guided to the upper rear at the time of a front collision of the vehicle V, whereby the interference between the components (such as the fuel pipe) disposed around the engine and the broken portion can be avoided. It should be noted that, in the drawing, the solid line illustrates the state before the collision and the double chain line illustrates the state after the collision.

Since the first coupling members 30 and the second coupling member 40 form the closed cross section C1 extending in the longitudinal direction by fitting the inner members 21b and 22b with the substantially U-shaped cross sections to the outer members 21a and 22a with the substantially U-shaped cross sections, the bending rigidity of the first coupling members 30 and the second coupling member 40 is increased by the closed cross section C1 formed in cooperation by the outer members and the inner members and the torsional rigidity of the first coupling members 30 and the second coupling member 40 can be controlled by the open cross section formed by one of the outer members 21a and 22a, and the inner members 21b and 22b.

Since the closed cross section C1 is asymmetric with respect to the middle line C of the cross section orthogonal to the longitudinal direction in the cross section, even when a bending load is input to the first coupling members 30, the bending load can be easily converted to torsional displacement of first coupling members 30.

Since the ratio of the volume of the reinforced layer portion to the volumes of the first coupling members 30 and the second coupling member 40 is set to between 80% or more, e.g., between 80% and 90%, i.e., the volume of the carbon fiber reinforced plastic layer having an orientation of 0° is set to 80% or more, the compatibility between the practical utility and the suppressive effects of the body torsional mode and the membrane vibration mode can be achieved. The suppressive effects of the body torsional mode and the membrane vibration mode may not be sufficient when the ratio of the volume of the reinforced layer portion is less than 80%, but the vehicle body behavior modes can be suppressed while measures against electrolytic corrosion of the first coupling member and the second coupling member are taken when the ratio of the volume of the reinforced layer portion is 80% or more.

Next, a modification in which the embodiment is partially changed will be described.

1) Although an example of the first coupling members 30 and the second coupling member 40 made of carbon fiber reinforced plastic has been described in the embodiment, the fibers extending in the longitudinal direction only need to be more than the fibers extending in directions other than the longitudinal direction and the material of the first coupling members 30 and the second coupling member 40 is not limited to carbon fiber.

In addition, an example in which the ratio of the volume of the reinforced layer portion of the fibers extending in the longitudinal direction is 80% has been described, but the ratio of the volume of the reinforced layer portion may be more than 80%.

2) Although an example in which the cross section (closed cross section C2) orthogonal to the longitudinal direction of the second coupling member 40 is symmetric with respect to the middle line of the cross section and substantially trapezoidal has been described, the vibration damping performance can be further increased by forming the cross section asymmetrically with respect to the middle line of the cross section.

3) Although an example of a strut suspension has been described in the embodiment, at least a cylindrical tower member projecting upward only needs to be provided and the present invention may be applied to a vehicle having a swing arm or multilink suspension.

4) Other than the above, those skilled in the art can practice the present invention as an embodiment in which various changes are made to the embodiment described above or an embodiment in which individual embodiments are combined with each other without departing from the scope of the present invention, and the present invention also includes such changed embodiments.

DESCRIPTION OF REFERENCE SIGNS AND NUMERALS

1: dash panel
2: front side frame
4: strut tower
6: cowl member
20: strut tower bar
30: first coupling member
31: first coupling outer member
31x: bent portion
32: first coupling inner member
32x: bent portion
40: second coupling member
41: second coupling outer member
42: second coupling inner member
50: front fixing member
60: rear fixing member
V: vehicle
R: vehicle interior
E: engine room
L1: (orientation 90°) fiber reinforced plastic layer
L2: (orientation 0°) fiber reinforced plastic layer

The invention claimed is:

1. A front body structure of a vehicle comprising:
a dash member that extends in a vehicle width direction and separates a vehicle interior from an engine room;
a pair of left and right front side frames that extend forward in a vehicle front-rear direction from left and right end portions of the dash member;
a pair of left and right suspension tower members fixed to the pair of front side frames, the pair of left and right suspension tower members projecting upward to support upper portions of dampers of a suspension device; and
a first coupling member that couples the dash member to a suspension member, wherein
the first coupling member has a reinforced layer portion made of fiber reinforced plastic in which fibers are impregnated with a synthetic resin material, and
the fibers of the reinforced layer portion are oriented so that more fibers extend in a longitudinal direction than extend in directions other than the longitudinal direction, wherein a ratio of a volume of the reinforced layer portion to a volume of the first coupling member is set to 80% or more.

2. The front body structure of a vehicle according to claim 1, further comprising:
a pair of left and right first coupling members that couple the dash member to the pair of suspension tower members, the first coupling member being one of the pair of left and right first coupling members;
a second coupling member that couples rear end portions of the pair of first coupling members to each other;
a pair of left and right front fixing members that fix front end portions of the pair of first coupling members to the pair of suspension tower members; and
a pair of left and right rear fixing members that connect, at connection portions, rear end portions of the pair of first coupling members to side end portions of the second coupling member and fixes the connection portions to the dash member,
wherein the pair of first coupling members and the second coupling member are substantially U-shaped in plan view.

3. The front body structure of a vehicle according to claim 2, wherein the first coupling member has a bent portion that projects upward and extends in the vehicle width direction.

4. The front body structure of a vehicle according to claim 3,
wherein the first coupling member and the second coupling member form a closed cross section extending in the longitudinal direction by fitting an inner member having a substantially U-shaped cross section to an outer member having a substantially U-shaped cross section.

5. The front body structure of a vehicle according to claim 4,
wherein the closed cross section is asymmetric with respect to a middle line of a cross section orthogonal to the longitudinal direction in the cross section.

6. The front body structure of a vehicle according to claim 2,
wherein the first coupling member and the second coupling member form a closed cross section extending in the longitudinal direction by fitting an inner member having a substantially U-shaped cross section to an outer member having a substantially U-shaped cross section.

7. The front body structure of a vehicle according to claim 1, wherein the first coupling member has a bent portion that projects upward and extends in the vehicle width direction.

8. The front body structure of a vehicle according to claim 7, further compromising:
a pair of left and right first coupling members that couple the dash member to the pair of suspension tower members, the first coupling member being one of the pair of left and tight first coupling members; and
a second coupling member that couples rear end portions of the pair of first coupling members to each other;
wherein the first coupling member and the second coupling member form a closed cross section extending in the longitudinal direction by fitting an inner member having a substantially U-shaped cross section to an outer member having a substantially U-shaped cross section.

9. The front body structure of a vehicle according to claim 7, the bent portion is in an intermediate portion of the first coupling member.

10. A front body structure of a vehicle comprising:
a dash member that extends in a vehicle width direction and separates a vehicle interior from an engine room;
a pair of left and right front side frames that extend forward in a vehicle front-rear direction from left and right end portions of the dash member;
a pair of left and right suspension tower members fixed to the pair of front side frames, the pair of left and right suspension tower members projecting upward to support upper portions of dampers of a suspension device; and
a first coupling member that couples the dash member to a suspension member, wherein
the first coupling member has a reinforced layer portion made of fiber reinforced plastic in which fibers are impregnated with a synthetic resin material, and
the fibers of the reinforced layer portion are oriented so that more fibers extend in a longitudinal direction than extend in directions other than the longitudinal direction,
wherein the reinforced layer portion includes a layer of fibers extending in directions other than the longitudinal direction sandwiched between two layers of fibers extending in the longitudinal direction.

11. The front body structure of a vehicle according to claim 10,
wherein the reinforced layer portion includes a surface layer on surfaces of the two layers of fibers extending in the longitudinal direction opposite the layer of fibers extending in directions other than the longitudinal direction.

12. The front body structure of a vehicle according to claim 11, wherein a volume of the surface layer is greater than a volume of the layer of fibers extending in directions other than the longitudinal direction and less a volume of the two layers of fibers extending in the longitudinal direction have a same thickness.

13. The front body structure of a vehicle according to claim 10, wherein the two layers of fibers extending in the longitudinal direction have a same thickness.

14. The front body structure of a vehicle according to claim 10, wherein the layer of fibers extending in directions other than the longitudinal direction extend in a direction orthogonal to the longitudinal direction.

15. A front body structure of a vehicle comprising:
a dash member that extends in a vehicle width direction and separates a vehicle interior from an engine room;
a pair of left and right front side frames that extend forward in a vehicle front-rear direction from left and right end portions of the dash member;
a pair of left and right suspension tower members fixed to the pair of front side frames, the pair of left and right suspension tower members projecting upward to support upper portions of dampers of a suspension device; and
a first coupling member that couples the dash member to a suspension member, wherein
the first coupling member has a reinforced layer portion made of fiber reinforced plastic in which fibers are impregnated with a synthetic resin material, and
the fibers of the reinforced layer portion are oriented so that more fibers extend in a longitudinal direction than extend in directions other than the longitudinal direction,
wherein a ratio of a volume of the reinforced layer portion having fibers that extend in a longitudinal direction is an order of magnitude more than a volume of the reinforced layer portion having fibers that extend in directions other than the longitudinal direction.

16. The front body structure of a vehicle according to claim 15, wherein
the first coupling member has a bent portion that projects upward and extends in the vehicle width direction, the bent portion being in an intermediate portion of the first coupling member.

17. The front body structure of a vehicle according to claim 15, further comprising:
a pair of left and right first coupling members that couple the dash member to the pair of suspension tower members, the first coupling member being one of the pair of left and right first coupling members;
a second coupling member that couples rear end portions of the pair of first coupling members to each other;
a pair of left and right front fixing members that fix front end portions of the pair of first coupling members to the pair of suspension tower members; and
a pair of left and right rear fixing members that connect, at connection portions, rear end portions of the pair of first coupling members to side end portions of the second coupling member and fixes the connection portions to the dash member,
wherein the pair of first coupling members and the second coupling member are substantially U-shaped in plan view.

18. The front body structure of a vehicle according to claim 10, wherein
the first coupling member has a bent portion that projects upward and extends in the vehicle width direction, the bent portion being in an intermediate portion of the first coupling member.

19. The front body structure of a vehicle according to claim 10, further comprising:
a pair of left and right first coupling members that couple the dash member to the pair of suspension tower members, the first coupling member being one of the pair of left and right first coupling members;
a second coupling member that couples rear end portions of the pair of first coupling members to each other;
a pair of left and right front fixing members that fix front end portions of the pair of first coupling members to the pair of suspension tower members; and
a pair of left and right rear fixing members that connect, at connection portions, rear end portions of the pair of first coupling members to side end portions of the second coupling member and fixes the connection portions to the dash member,
wherein the pair of first coupling members and the second coupling member are substantially U-shaped in plan view.

20. The front body structure of a vehicle according to claim 19,
wherein the first coupling member and the second coupling member form a closed cross section extending in the longitudinal direction by fitting an inner member having a substantially U-shaped cross section to an outer member having a substantially U-shaped cross section.

* * * * *